United States Patent [19]

Shu

[11] Patent Number: 4,942,480
[45] Date of Patent: Jul. 17, 1990

[54] REPRODUCTION OF HALFTONE ORIGINAL WITH MOIRE REDUCTION AND TONE ADJUSTMENT

[75] Inventor: Joseph S. Shu, White Plains, N.Y.

[73] Assignee: Nynex Corporation, White Plains, N.Y.

[21] Appl. No.: 241,073

[22] Filed: Sep. 6, 1988

[51] Int. Cl.$^5$ .............................................. H04N 1/40
[52] U.S. Cl. ..................................... 358/455; 358/454; 358/456
[58] Field of Search ............... 358/283, 456, 280, 443, 358/298, 454, 455, 457, 459

[56] References Cited

U.S. PATENT DOCUMENTS

| | | | |
|---|---|---|---|
| 4,051,536 | 9/1977 | Roetling | 358/298 |
| 4,080,634 | 3/1978 | Schreiber | 358/283 |
| 4,194,221 | 3/1980 | Stoffel | 358/283 |
| 4,196,452 | 4/1980 | Warren et al. | 358/283 |
| 4,196,453 | 4/1980 | Warren | 358/447 |
| 4,210,936 | 7/1980 | Cinque et al. | 358/283 |
| 4,246,614 | 1/1981 | Knox | 358/283 |
| 4,308,326 | 12/1981 | Wirth | 358/283 |
| 4,350,996 | 9/1982 | Rosenfeld | 358/78 |
| 4,413,286 | 11/1983 | Boston | 358/283 |
| 4,447,830 | 5/1984 | Stoffel | 358/283 |
| 4,486,788 | 12/1984 | Yamada | 358/283 |
| 4,498,108 | 2/1985 | Lindemann et al. | 358/283 |
| 4,524,388 | 6/1985 | Abe et al. | 358/163 |
| 4,538,184 | 8/1985 | Otsuka et al. | 358/283 |
| 4,556,918 | 12/1985 | Yamazaki et al. | 358/283 |
| 4,651,287 | 3/1987 | Tsao | 358/283 |
| 4,730,221 | 3/1988 | Roetling | 358/283 |

Primary Examiner—James J. Groody
Assistant Examiner—Kim Yen Vu
Attorney, Agent, or Firm—Douglas Kirk; John J. Torrente

[57] ABSTRACT

Reproduction of an original containing screened artwork is accomplished by selecting the scanning frequency to have a predetermined relationship to the screen frequency of the artwork and by utilizing adaptive thresholding methodology to convert the scanned digital signals to processed binary signals which are such as to result in the average gray levels over corresponding arrays of binary signals and digital signals being approximately equal.

42 Claims, 2 Drawing Sheets

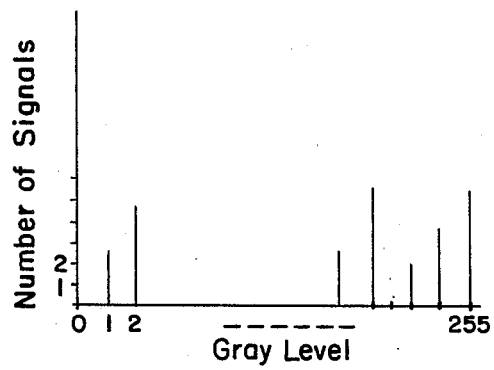
FIG. 3
| Fill of Halftone Dots | Original Density | Scanned Average Gray Intensity | Thresholded Average Gray Intensity | Printed Density |
|---|---|---|---|---|
| 0% | 0.11 | 255 | 255 | 0.16 |
| 10% | 0.18 | 232 | 240 | 0.21 |
| 20% | 0.23 | 210 | 218 | 0.29 |
| 30% | 0.31 | 187 | 195 | 0.40 |
| 40% | 0.38 | 158 | 171 | 0.53 |
| 50% | 0.45 | 137 | 140 | 0.75 |
| 60% | 0.60 | 105 | 85 | 1.17 |
| 70% | 0.74 | 87 | 64 | 1.40 |
| 80% | 0.89 | 63 | 37 | 1.70 |
| 90% | 1.16 | 41 | 15 | 1.85 |
| 100% | 1.65 | 20 | 0 | 1.85 |
FIG. 4
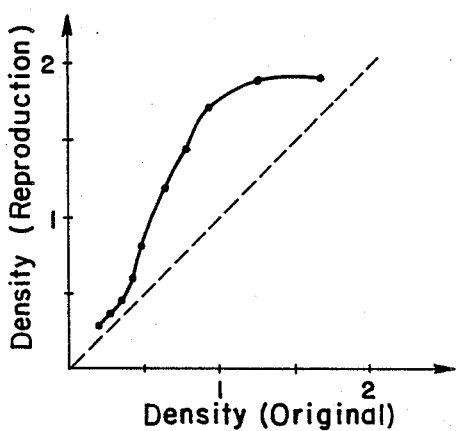
FIG. 5

REPRODUCTION OF HALFTONE ORIGINAL WITH MOIRE REDUCTION AND TONE ADJUSTMENT

BACKGROUND OF THE INVENTION

This invention relates to an apparatus and method for reproducing an image and, in particular, to an apparatus and method for reproducing an original image containing screened artwork.

In the production of the Yellow pages, hard copy master pages are prepared for use in the production process. These master pages include listings, line artwork and screened artwork. Listings are produced by a contrast sub-system and line and screened artwork by an Ad generation sub-system.

In line artwork, the images comprise continuous areas of either black or white and there is no gray level or tone present. In screened artwork, the images contain black dots (so-called "halftone dots") having a predetermined frequency (screen frequency) in dots per inch. These dots are changed in size from area to area to provide different shades of gray from black (i.e., a gray level of 0) to white (i.e., a gray level of 255).

In the present Yellow pages production, the line artwork on the hard copy master pages is developed by first scanning the original in digital fashion (i.e., element by element). This scanning is at some frequency in elements per inch and results in a digital signal for each elemental area of the original. These digital signals are then subjected to a thresholding process to accommodate the system phototypesetter which is binary and, thus, can only typset black or white graphics and text.

In the thresholding operation, each signal is converted to a gray level indicative of black or white. Usually, a gray level for the threshold is selected halfway between the gray level values for black and white. Thus, the threshold is set at 128 (i.e., one-half of 255) and digital signals indicative of gray levels below 128 are converted to 0 or black gray level signals and those above 128 are converted to 255 or white gray level signals.

The digital signals after thresholding are paginated with the listings and then stored electronically on a page by page basis leaving blank areas for any screened artwork to be included on a page. The latter artwork, in turn, is photographed from the original and the photographs are also stored.

When the hard copy master pages are produced, the electronically stored digital signals are used to address the system phototypesetter which typesets the pages in accordance with the digital signals. The resultant phototypesetted pages also contain the blank areas for the screened artwork. The photographs containing this artwork are then pasted in the corresponding areas to complete production of the hard copy master pages.

As can be appreciated, the need to form the hard copy master pages by pasting on photographs of the screened artwork is tedious, time consuming and costly. Electronically handling the screened artwork, like the line artwork, would, therefore, appear to be a more desirable way to process this artwork. However, attempts at scanning and digitizing the screened artwork (typically, this artwork is at a screen frequency of 85 halftone dots per inch) with the existing scanning and printing equipment for the line artwork (typically operated at a scanning frequency of 723 lines or elements per inch) have proven unsatisfactory.

Thus, the electronically reproduced screened artwork exhibits so called Moirè patterns which are beat patterns of the scanning and screen frequencies. These beat patterns are a result of incorrectly reproducing the size of the halftone dots of the screened artwork. The electronically reproduced screened artwork also exhibits incorrect tone which results in low quality of highlight and shadow details. Thus, the existing scanning equipment is incapable of providing a satisfactory digitized reproduction on the hard copy master pages of the screened artwork.

It is, therefore, a primary object of the present invention to provide a system and method which can be used to electronically reproduce screened or halftone dot artwork with substantial elimination of Moirè patterns.

It is a further object of the present invention to provide a system and method which can be used to electronically reproduce screened artwork with good tonal quality.

SUMMARY OF THE INVENTION

In accordance with the principles of the present invention, the above and other objects are realized in a practice wherein the scanning frequency at which the screened artwork is scanned has a preselected relationship with respect to the screen frequency of the artwork and wherein the digital signals resulting from the scanning of the elemental areas or elements of the artwork are processed by an adaptive thresholding methodology using a predetermined two-dimensional processing window to ensure that the average gray level over each array of resultant signals for the reproduction approximates the average gray level over the corresponding array of digital signals of the original screened artwork.

In accord with the invention, the scanning frequency is selected so that it is in the range of about 7 to 12 times the screen frequency. The processing window, furthermore, is selected to extend two-dimensionally to cover at each position an array of digitial signals corresponding to an array of elements of the original which encompass the spacing or a multiple of the spacing between the halftone dots of the screened artwork as measured in the scan direction (e.g., an extent equal to the halftone dot spacing for an angle between the scan and screen directions of 0° and an extent of $\sqrt{2}$ times the halftone dot spacing for an angle of 45°). With the scanning frequency and window size so selected, the system has been found to reproduce the artwork substantially without the appearance of Moirè patterns.

In further accord with the invention, the tonal quality of the reproduced screened artwork is also improved by adjusting the thresholding methodology to account for tonal variations resulting from the scanning and printing equipment. This is accomplished by determining the gray level changes attributable to the latter equipment and adjusting the average gray level values of the arrays of digital signals to compensate for certain undesired changes.

BRIEF DESCRIPTION OF THE DRAWINGS

The above and other features and aspects of the present invention will become more apparent upon reading the following detailed description in conjunction with the accompanying drawings, in which:

FIG. 3 illustrates a histogram used in the electronic processing of the scanned signals of the system of FIG. 1;

FIG. 4 shows a table indicative of the tone shift caused by the scanner, printer and like equipment in the system of FIG. 1; and FIG. 5 is a plot of the output versus input density values set forth in the table of FIG. 4.

DETAILED DESCRIPTION

Figure 1:
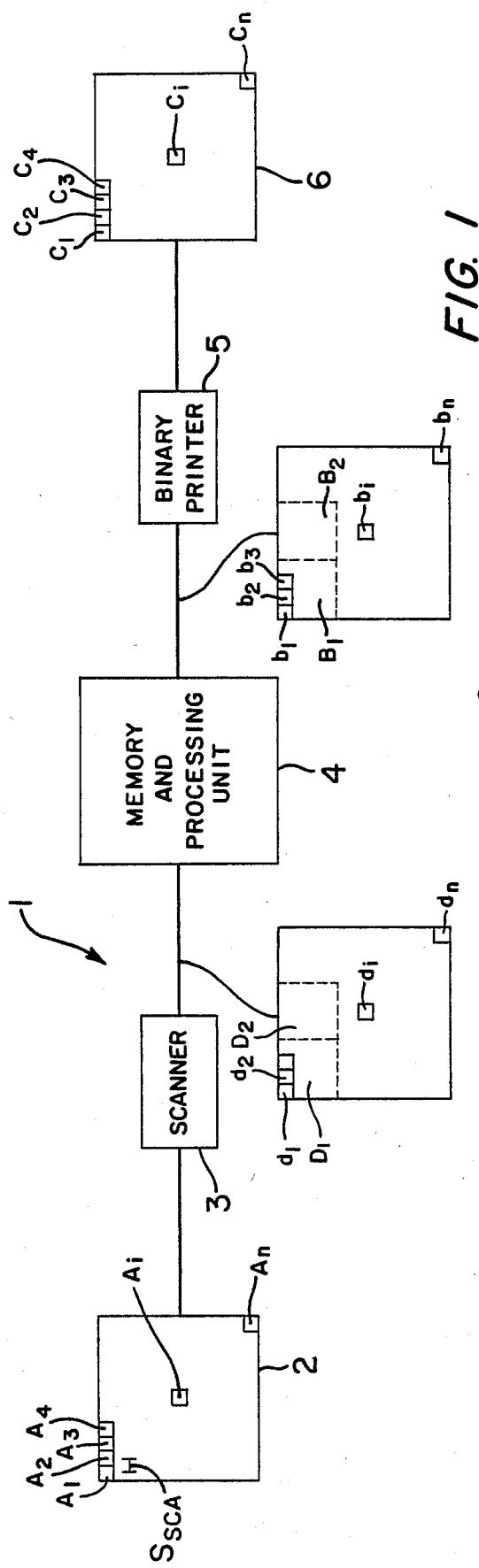
FIG. 1 shows a system for reproducing screened artwork in accordance with the principles of the present invention.

FIG. 1 illustrates a system 1 for reproducing screened artwork, in accordance with the principles of the present invention. A screened original 2 is scanned by a scanner 3 to develop digital signals $d_1 \ldots d_i \ldots d_n$. These signals are indicative of the gray levels of the individual elemental areas $A_1 \ldots A_i \ldots A_n$ of the original 2. Typically, each digital signal $d_i$ is a 1 byte signal (i.e., contains 8 bits) and will range in value from 0 (indicative of a 0 gray level or black) to 255 (indicative of a 255 gray level or white).

The digital signals $d_i$ are coupled to a memory and processing unit 4 which processes the signals, as will be discussed below, to provide a corresponding set of processed binary signals $b_1 \ldots b_i \ldots b_n$ each indicative of a gray level of either 0 (black) or 255 (white). The binary signals $b_i$ are stored in the memory of the unit 4 until reproduction of the original screened artwork 2 is desired.

At the time of reproduction, the binary signals $b_i$ are used to address a binary printer 5 i.e., a printer which prints a mark indicative of black or a 0 gray level or which fails to print a mark indicative of white or a 255 gray level. The printer 5 provides the corresponding gray level in the associated elemental area $C_i$ of a reproduction 6. The printer does this for all elemental areas $C_1$ to $C_n$ corresponding to the elemental areas $A_1$ to $A_n$ in the original, to result in a desired reproduction 6.

In accordance with the principles of the present invention, the scanning and processing operations of the system 1 are carried out such that the appearance of unwanted Moirè patterns in the reproduction 6 are significantly reduced or eliminated. This is accomplished by appropriate selection of the scanning frequency of the scanner 3 and by using an appropriately selected adaptive thresholding methodology and processing window during processing of the digital signals $d_i$ to generate the binary signals $b_i$.

Figure 2:
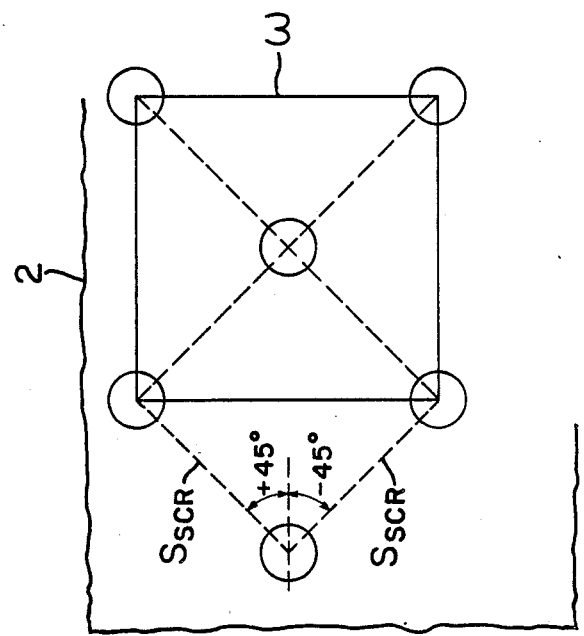
FIG. 2 shows the halftone dot pattern of the screened artwork of FIG. 1 and the relationship of the electronic scanning window to the dot pattern.

More particularly, as shown in FIG. 2, the original screened artwork 2 comprises halftone dots which are situated in screen directions angled at a standard angle, shown as $\pm 45°$, to the horizontal scanning direction of the scanner 3. Each of the halftone dots is spaced by a common spacing $S_{SCR}$ from its immediately preceding and succeeding dots in the screen directions. The dot pattern thus defines a so-called screen frequency $F_{SCR}$ in dots per inch in the screen directions equal to $1/S_{SCR}$. The scanner 3 also defines a scanning frequency $f_{SCA}$ in the horizontal scan direction which is equal to $1/S_{SCA}$, where $S_{SCA}$ is the horizontal spacing between successive elemental areas $A_i$ of the artwork 2.

In accord with the invention, the scanning frequency $f_{SCA}$ is selected to be in a range of about 7 to 12 times the screen frequency $f_{SCR}$. With the scanning frequency in this range and using the adaptive thresholding and the processing window of the invention, it has been found that significant Moirè reduction can be achieved for the reproduced artwork 6, while still maintaining the amount of signal data to be processed within relatively low limits.

More particularly, the adaptive thresholding methodology used by the processing unit 4 is such as to force the average gray level over each one of a number of a non-overlapping arrays of the resultant binary signals $b_1$ to $b_n$ to be equal to or closely approximate the average gray level over a corresponding array of the digital signals $d_1$ to $d_n$. Thus, the average gray levels $G_{AO1} \ldots G_{AOi} \ldots G_{AOn}$ over the respective binary signal arrays $B_1 \ldots B_i \ldots B_n$ of the signals $b_1$ to $b_n$ are caused to approximate the average gray levels $G_{AI1} \ldots G_{AIi} \ldots G_{AIn}$ over the respective digital signal arrays $D_i \ldots D_i \ldots D_n$ of the signals $d_i$ to $d_n$.

This is accomplished in the processing unit 4 by utilizing a two dimensional processing window W to threshold process the digital signals $d_i$ on an array by array basis (corresponding to the arrays $D_1$ to $D_n$) to thereby generate the binary signals $b_i$. The processing window W thus defines the extent of the arrays $D_1$ to $D_n$ and, in accord with the invention, the window is selected to have a width and length which is sufficient to cover digital signals corresponding to elemental areas of the original 2 which extend over a distance equal to or a multiple of the halftone dot spacing as measured in the scan direction.

In the present illustrative case, the scan direction is in the horizontal direction and the spacing between the halftone dots in the screen directions, which are at $\pm 45°$ to the horizontal scan direction, is $S_{SCR}$. Accordingly, the spacing between the halftone dots in the scan direction is $\sqrt{2} S_{SCR}$. The length and width of the processing window will thus be equal to or a multiple of $\sqrt{2} S_{SCR}$. Each of the arrays $D_i$ will therefore encompass digital signals $d_i$ corresponding to elements $A_i$ within a square or rectangle of side extent $\sqrt{2} S_{SCR}$ or a multiple thereof.

The processing operation is initiated by the processing window W first processing the stored digital signals $d_1$–$d_m$ (corresponding to the elements $A_1$–$A_m$) in the digital signal array $D_1$. In particular, the gray levels represented by these signals are added and divided by the total number of signals to obtain the average gray level value $G_{AI1}$ for the array $D_1$. Once this average gray level value $G_{AI1}$ is obtained, it is used to determine a threshold value $Th_1$, as will be explained below, for developing the binary signals $b_1$ to $b_m$ from the corresponding digital signals $d_1$ to $d_m$. Specifically, digital signals indicative of gray levels above the threshold $Th_1$ result in corresponding binary signals indicative of a 255 gray level, i.e., white. Digital signals indicative of gray levels below the threshold $Th_1$, in turn, result in corresponding binary signals indicative of a 0 gray level or black.

By this manner of thresholding, the resultant binary signals $b_1$ to $b_m$ for the array $B_1$ will provide an average gray level $G_{AO1}$ which approximates that of the signals $d_1$ to $d_m$, i.e., which approximates $G_{AI1}$.

Once the signals $b_1$ to $b_m$ for the $B_1$ array are developed by the processing unit 4, they are stored in positions corresponding to their elements $A_1$ to $A_m$. The processing window W then proceeds to process the digital signals of the next digital array $A_2$. These signals are processed in the same manner as the signals $d_1$ to $d_m$. Thus, an average gray level $G_{AI2}$ is first developed and it is then used to determine a threshold $Th_2$ for developing binary signals whose average gray level $G_{AO2}$ approximates the value $G_{AI2}$. The generated binary signals are then also stored.

The processing window then moves to process in succession, the digital signals of the remaining arrays $B_3$ to $B_n$. Similar threshold processing, as above-described, occurs for each array so that binary signals are developed for the arrays whose average gray levels $G_{AO3}$ to $G_{AOn}$ closely approximate the average gray levels $G_{AI3}$ to $G_{AIn}$.

Once the binary signals $b_i$ for all the arrays have been generated and stored, the printing of the reproduction 6 can be carried out. In further accord with the invention, this printing operation is effected on a line-by-line basis. In particular, the printer 5 is addressed by the processing unit 4 so that the generated binary signals corresponding to an entire line of print of the original artwork are fed to the printer on a line-by-line basis. The printer 5 thus provides a mark (black) or no mark (white), as determined by the associated digital signal, on a line until the entire line is printed and continues to print lines until the reproduction 6 is completed.

The generation of the threshold values $Th_i$ used by the processing unit 4 to develop the binary signals $b_i$ from the digital signals $d_i$ can take on a variety of forms. One convenient form is to arrange the digital signals $d_i$ of the particular array $D_i$ in a histogram format of gray level values from 0 to 255, as illustrated in FIG. 3. The average gray level value $GAI_i$ of the digital signals of the array $D_i$ is then multiplied by the total number of signals in the array and the resultant product divided by 255 to determine the number m of white or 255 value gray level binary signals needed in the binary signal array $B_i$. The digital signals starting with those at the highest gray level are then counted according to the histogram until m signals are counted. The gray level value of the histogram gray level coordinate containing the $m^{th}$ signal is then selected as the threshold value $Th_i$ for the array. As discussed above, each digital signal which exceeds the threshold is then assigned a binary signal representative of a 255 gray level or white signal in the binary array $B_i$, and each digital signal which is less than the threshold is assigned a binary signal representative of a 0 gray level or black signal in the binary array $B_i$.

While the system 1, as described above, significantly reduces the appearance of unwanted Moirè patterns in the reproduction 6, the reproduction may still suffer from reduced tonal quality due to the scanning, printing and other equipment of the system. In further accordance with the invention, this condition is compensated for by modifying the average gray level values $G_{AI1}$ to $G_{AIn}$ utilized in the aforementioned processing by adjustment factors stored in a look-up table in the processing unit 4 and designed to compensate or adjust in a preselected manner for the tonal or gray level shift or change due to the scanner, printer and other system equipment.

The particular look-up table of adjustment factors used in any reproduction system 1 will depend upon the characteristics of the equipment employed in the system. These characteristics and how they create tonal shift can be determined by using the system, as above-described, to reproduce successive screened artwork patterns of uniform halftone dots, where the fill of dots from pattern to pattern is stepped from 0% to 100% such as, for example, in equal steps of 10%. By measuring the density of each screened pattern and the density of each corresponding reproduced pattern, the relationship between original and reproduction densities of the system from scanner to printer can be determined. Once determined, this relationship can be translated into a corresponding relationship between original and reproduction average gray values and any undesired deviations can be used to generate the aforementioned adjustment factors for the look-up table.

FIG. 4 shows a table developed following the above procedure for tonal correction for a typical Yellow pages reproduction system also adapted, as above-described, for Moirè pattern suppression. In this system, $f_{SCR}$ equals 85 dots per inch and $f_{SCA}$ equals 723 lines per inch. FIG. 5 illustrates, an actual plot of the reproduction density versus original density for the FIG. 4 values.

As can be appreciated from FIGS. 4 and 5, the output density of the reproduction shows no substantial change for low input densities (below about 0.21) and high input densities (about 1.70) of the original. These densities, in turn, correspond to average gray levels of the binary arrays above about 240 and below about 37. This means that the system cannot produce gray level changes and thus tonal variations for average gray levels of the signals $b_i$ within these ranges (i.e., above about 240 and below about 37).

Since these ranges correspond to average ranges of the digital signals $d_i$ which, in turn, correspond to average ranges of the original, it is evident that changes over the entire range of gray levels of the original will not result in changes in the reproduction gray level, without some adjustment in the system. In particular, by adjusting the system so that the average gray levels of the arrays of digital signals $d_i$ are within the range of 37 to 240, all the average gray levels of the scanned original will then result in discernible gray level changes in the reproduction.

The manner in which the average gray levels $G_{AIi}$ are adjusted will depend upon the particular situation and what adjustment is found visually most desirable. One possible adjustment is to provide a linear conversion of the gray levels $G_{AIi}$ over their respective range of 20 to 255 to gray levels over the range 37 to 240. An expression for such linearly adjusted average gray levels $G'_{AIi}$ based on the original average gray levels $G_{AIi}$ is as follows:

$$G'_{AIi} = (G_{AIi} - 20) \times (244 - 37)/(255 - 20) + 37 \tag{1}$$

Values defined by the aforesaid expression (1) can be stored in the unit 4 to define the aforementioned tone adjustment look-up table and, therefore, simply looked up during threshold processing by the unit.

If, on the other hand, a linear conversion of the average gray levels of the digital signal arrays is not found to be the most desirable approach, a look-up table may be generated based upon a three-piece linear conversion of the gray levels. Such a three piece conversion breaks the tone range into highlight, midtone and shadow regions and for the gray levels of the FIG. 4 table may be as follows:

$$G'_{AIi} = (G_{AIi} - 200) \times 0.75 + 200; \text{ for } G_{AIi} > 200 \tag{2}$$

$$G'_{AIi} = G_{AIi}; \text{ for } 100 < G_{AIi} < 200 \tag{3}$$

$$G'_{Ali} = 100 - (100 - G_{Ali}) \times 0.6; \text{ for } G_{Ali} < 100 \quad (4)$$

Using equations (2)-(4), the adjusted average gray levels will thus be in the range of about 52 to 238.

Furthermore, if tone correction is not desired, the look-up table reduces to a constant value such that $$G'_{Ali} = G_{Ali} \times k, \text{ where k is a constant} \quad (5)$$

While the above represent two possible tone adjustment look-up table conversions for the FIG. 4 table values, in actual practice, as above-indicated, tone adjustment will be a function of the particular system equipment being used and will likely be non-linear. Its determination will thus depend on the system equipment and requirements and, in general, can be empirically determined.

In the thresholding processing operation of the unit 4, the tone adjustment look-up table is used to adjust the average values $G_{AI1}$ to $G_{AIn}$ to develop adjusted values $G'_{AI1}$ to $G'_{AIn}$ in accordance with the table. These adjusted values are then used to develop the threshold values $Th_i$ for generating the binary signals $b_i$ from the digital signals $d_i$.

As can be appreciated from the above, the overall effect of the system 1 is thus to provide a reproduction 6 which is substantially free of Moirè patterns and, if tone correction is employed, which has improved highlight and shadow detail. The system thus simply and readily provides for reproduction of the screened artwork 2 in an advantageous manner.

In all cases, it is understood that the above-identified arrangements are merely illustrative of the many possible specific embodiments which represent applications of the present invention. Numerous and varied other arrangements can readily be devised in accordance with the principles of the present invention without departing from the spirit and scope of the invention.

What is claimed is:

1. A method for use in creating a reproduction of an original image containing screened artwork formed by halftone dots having a predetermined screen frequency and a predetermined halftone dot spacing in a screen direction, the method comprising the steps of:

scanning the original in a scan direction on an element by element basis to form a digital signal for each element indicative of the gray level of the element, said scanning being at a predetermined scanning frequency having a predetemined relationship with respect to the predetermined screen frequency;

storing the digital signals;

and processing the digital signals to develop corresponding processed signals comprising: providing a two-dimensional processing window for processing arrays of said digital signals corresponding to different, non-overlapping arrays of said elements; and for each array of digital signals being processed by said window (i) forming the processed array of signals such that each processed signal is indicative of a first or a second gray level and such that the average of the gray levels signified by the processed array of signals approximates the average of the gray levels signified by the array of digital signals.

2. A method in accordance with claim 1 wherein: said scanning frequency is in a range of about 7 to 12 times the screen frequency.

3. The method of claim 1 wherein:
    said scanning frequency is in the range of about 7 to 12 times the screen frequency.

4. The method of claim 1 wherein:
    said window is of extent in both directions equal to or a multiple of the halftone dot spacing in the scan direction.

5. The method of claim 4 wherein:
    the halftone dots of said original are in screen directions of approximately $\pm 45°$ degrees relative to the scan direction;
    and said window extent in both directions is $\sqrt{2}$ times the halftone dot spacing in the screen direction.

6. The method of claim 1 wherein:
    said first gray level is indicative of white and said second gray level is indicative of black.

7. The method of claim 1 wherein:
    each of said processed signals is a binary signal.

8. The method of claim 1 wherein:
    said step (i) includes causing the processed signal corresponding to each digital signal to be indicative of said first gray level value when the gray level signified by the digital signal exceeds a threshold gray level and causing the processed signal corresponding to each digital signal to be indicative of said second gray level value when th gray level signified by the digital signal is less than the said threshold gray level.

9. The method of claim 8 wherein:
    said threshold gray level is dependent on the average gray level signified by the digital signals of the particular digital signal array being processed.

10. The method of claim 1 further comprising:
    forming a reproduction of said original from said processed signals.

11. The method of claim 10 wherein:
    said step (i) includes adjusting the average gray level of the digital signal array in accordance with a predetermined gray level adjustment characteristic.

12. The method of claim 11 wherein:
    said adjustment characteristic adjusts for certain gray level changes attributable to the scanning and reproduction forming steps.

13. The method of claim 12 wherein:
    said adjustment characteristic is stored in a look-up table.

14. The method of claim 10 wherein:
    said forming step includes forming said reproduction from said processed signals on a line-by-line basis.

15. The method of claim 1 wherein:
    said non-overlapping arrays of elements encompass said entire area of said original image containing said halftone dots.

16. A method for use in creating a reproduction of an original image containing screened artwork formed by halftone dots having a predetermined screen frequency and a predetermined halftone dot spacing in a screen direction, the original having been scanned in a scan direction on an element by element basis to form a digital signal for each element indicative of the gray level of the element, said scanning being at a predetermined scanning frequency having a predetermined relationship with respect to the predetermined screen frequency; and the digital signals having been stored; the method comprising:

processing the digital signals to develop corresponding processed signals comprising: providing a two-dimensional processing window for processing arrays of said digital signals corresponding to different non-overlapping arrays of said elements; and for each array of digital signals being processed by said window (i) forming the processed array of signals such that each processed signal is indicative of a first or a second gray level and such that the average of the gray levels signified by the processed array of signals approximates the average of the gray levels signified by the array of digital signals.

17. The method of claim 16 wherein:
said scanning frequency is in the range of about 7 to 12 times the screen frequency.

18. The method of claim 16 wherein:
said window is of extent in both directions equal to or a multiple of the halftone dot spacing in the scan direction.

19. The method of claim 18 wherein:
the halftone dots of said original are in screen direction of approximately ±45° degrees relative to the scan direction;
and said window extent in both directions is $\sqrt{2}$ times the halftone dot spacing in the screen direction.

20. The method of claim 20 wherein:
said step (i) includes causing the processed signal corresponding to each digital signal to be indicative of said first gray level value when the gray level signified by the digital signal exceeds a threshold gray level and causing the processed signal corresponding to each digital signal to be indicative of said second gray level value when the gray level signified by the digital signal is less than the said threshold gray level.

21. The method of claim 20 wherein:
said threshold gray level is dependent on the average gray level signified by the digital signals of the particular digital signal array being processed.

22. The method of claim 16 further comprising:
forming a reproduction of said original from said processed signals.

23. The method of claim 22 wherein:
said step (i) includes adjusting the average gray level of the digitial signal array in accordance with a predetermined gray level adjustment characteristic.

24. A method for use in creating a reproduction of an original image containing screened artwork formed by halftone dots having a predetermined screen frequency and a predetermined halftone dot spacing in a screen direction, the original having been scanned in a scan direction on an element by element basis to form a digital signal for each element indicative of the gray level of the element, said scanning being at a predetermined scanning frequency having a predetermined relationship with respect to the predetermined screen frequency; the digital signals having been stored and processed to develop corresponding processed signals, the processing comprising: providing a two-dimensional processing window for processing arrays of said digital signals corresponding to different non-overlapping arrays of said elements; and for each array of digital signals being processed by said window (i) forming the processed array of signals such that each processed signal is indicative of a first or a second gray level and such that the average of the gray levels signified by the processed array of signals approximates the average of the gray levels signified by the array of digital signals; the method comprising:
providing said processed signals;
and forming a reproduction of said original from said processed signals.

25. The method of claim 24 wherein:
said scanning frequency is in the range of about 7 to 12 times the screen frequency.

26. The method of claim 24 wherein:
said window is of extent in both directions equal to or a multiple of the halftone dot spacing in the scan direction.

27. The method of claim 24 wherein:
said step (i) includes causing the processed signal corresponding to each digital signal to be indicative of said first gray level value when the gray level signified by the digital signal exceeds a threshold gray level and causing the processed signal corresponding to each digital signal to be indicative of said second gray level value when the gray level signified by the digital signal is less than the said threshold gray level.

28. The method of claim 24 wherein:
said forming step includes forming said reproduction from said processed signals on a line-by-line basis.

29. Apparatus for use in creating a reproduction of an original image containing screened artwork formed by halftone dots having a predetermined screen frequency and a predetermined halftone dot spacing in a screen direction, the apparatus comprising:
means for scanning the original in a scan direction on an element by element basis to form a digital signal for each element indicative of the gray level of the element, said scanning being at a predetermined scanning frequency having a predetermined relationship with respect to the predetermined screen frequency;
means for storing the digital signals;
and means for processing the digital signals to develop corresponding processed signals, said processing means providing a two-dimensional processing window for processing arrays of said digital signals corresponding to different, non-overlapping arrays of said elements; and for each array of digital signals being processed by said window (i) said processing means forming the processed array of signals such that each processed signal is indicative of a first or a second gray level and such that the average of the gray levels signified by the processed array of signals approximates the average of the gray levels signified by the array of digital signals.

30. Apparatus in accordance with claim 29 wherein:
said scanning frequency is in a range of about 7 to 12 times the screen frequency.

31. Apparatus in accordance with claim 29 wherein:
said scanning frequency is in the range of about 7 to 12 times the screen frequency.

32. Apparatus in accordance with claim 29 wherein:
said window is of extent in both directions equal to or a multiple of the halftone dot spacing in the scan direction.

33. Apparatus in accordance with claim 32 wherein:
the halftone dots of said original are in screen directions of approximately ±45° degrees relative to the scan direction;

and said window extent in both directions is $\sqrt{2}$ times the halftone dot spacing in the screen direction.

34. Apparatus for use in creating a reproduction of an original image containing screened artwork formed by halftone dots having a predetermined screen frequency and a predetermined halftone dot spacing in a screen direction, the original having been scanned in a scan direction on an element by element basis to form a digital signal for each element indicative of the gray level of the element, said scanning being at a predetermined scanning frequency having a predetermined relationship with respect to the predetermined screen frequency; and the digital signals having been stored; the apparatus comprising:

means for processing the digital signals to develop corresponding processed signals, said processing means providing a two-dimensional processing window for processing arrays of said digital signals corresponding to different non-overlapping arrays of said elements; and for each array of digital signals being processed by said window (i) said processing means forming the processed array of signals such that each processed signal is indicative of a first or a second gray level and such that the average of the gray levels signified by the processed array of signals approximates the average of the gray levels signified by the array of digital signals.

35. Apparatus in accordance with claim 34 wherein:
said scanning frequency is in the range of about 7 to 12 times the screen frequency.

36. Apparatus in accordance with claim 34 wherein:
said window is of extent in both directions equal to or a multiple of the halftone dot spacing in the scan direction.

37. Apparatus in accordance with claim 36 wherein:
the halftone dots of said original are in screen direction of approximately ±45° degrees relative to the scan direction;
and said window extent in both directions is $\sqrt{2}$ times the halftone dot spacing in the screen direction.

38. Apparatus in accordance with method of claim 34 wherein said different arrays of elements are non-overlapping.

39. Apparatus for use in creating a reproduction of an original image containing screened artwork formed by halftone dots having a predetermined screen frequency and a predetermined halftone dot spacing in a screen direction, the original having been scanned in a scan direction on an element by element basis to form a digital signal for each element indicative of the gray level of the element, said scanning being at a predetermined scanning frequency having a predetermined relationship with respect to the predetermined screen frequency; the digital signals having been stored and processed to develop corresponding processed signals, the processing comprising: providing a two-dimensional processing window for processing arrays of said digital signals corresponding to different non-overlapping arrays of said elements; and for each array of digital signals being processed by said window (i) forming the processed array of signals such that each processed signal is indicative of a first or a second gray level and such that the average of the gray levels signified by the processed array of signals approximates the average of the gray levels signified by the array of digital signals; the apparatus comprising:

means for providing said processed signals;
and means for forming a reproduction of said original from said processed signals.

40. Apparatus in accordance with claim 39 wherein:
said scanning frequency is in the range of about 7 to 12 times the screen frequency.

41. Apparatus in accordance with claim 39 wherein:
said window is of extent in both directions equal to or a multiple of the halftone dot spacing in the scan direction.

42. Apparatus in accordance with claim 39 wherein:
said means for forming includes means for forming said reproduction from said processed signals on a line-by-line basis.

* * * * *